US012786754B2

(12) United States Patent
Chandran et al.

(10) Patent No.: US 12,786,754 B2
(45) Date of Patent: Nov. 3, 2026

(54) OPEN RADIO ACCESS NETWORK MAINTENANCE APPLICATIONS

(71) Applicant: Boost SubscriberCo L.L.C., Englewood, CO (US)

(72) Inventors: Premchand Chandran, Brambleton, VA (US); Gurpreet Sohi, Parker, CO (US); Julio Armenta, Aldie, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 534 days.

(21) Appl. No.: 18/213,195

(22) Filed: Jun. 22, 2023

(65) Prior Publication Data

US 2024/0430712 A1 Dec. 26, 2024

(51) Int. Cl.

| | |
|---|---|
| ***H04W 24/08*** | (2009.01) |
| ***H04L 41/0654*** | (2022.01) |
| ***H04L 41/082*** | (2022.01) |
| ***H04L 41/16*** | (2022.01) |
| ***H04W 24/04*** | (2009.01) |

(52) U.S. Cl.

CPC ......... *H04W 24/04* (2013.01); *H04L 41/0654* (2013.01); *H04L 41/082* (2013.01); *H04L 41/16* (2013.01); *H04W 24/08* (2013.01)

(58) Field of Classification Search

CPC ............... H04L 41/0654; H04L 41/082; H04L 41/0631; H04L 41/16; G06F 9/5083; G06N 20/00; H04B 7/18521; H04W 24/04; H04W 24/08; H04W 24/02

See application file for complete search history.

(56) References Cited

U.S. PATENT DOCUMENTS

| | | | | |
|---|---|---|---|---|
| 2011/0105109 A1 | 5/2011 | Uemura et al. | | |
| 2011/0171947 A1 * | 7/2011 | Okita | H04W 24/02 455/418 | |
| 2017/0353991 A1 | 12/2017 | Tapia | | |
| 2020/0022006 A1 | 1/2020 | Froehlich et al. | | |
| 2020/0196155 A1 * | 6/2020 | Bogineni | H04W 48/18 | |
| 2022/0295309 A1 | 9/2022 | Akhtar et al. | | |

(Continued)

FOREIGN PATENT DOCUMENTS

WO 2018/074587 A1 4/2018

OTHER PUBLICATIONS

Chandran et al., "Open Radio Access Network Maintenance Applications," U.S. Appl. No. 18/213,187, filed Jun. 22, 2023 (53 Pages).

(Continued)

*Primary Examiner* — Phuoc H Doan

(74) *Attorney, Agent, or Firm* — Kipman T. Werking; Frontier IP Law PLLC

(57) ABSTRACT

A disclosed method may include (i) building, based on telemetry data from an open radio access network, a machine learning model that predicts when a candidate distributed unit within the open radio access network will experience a failure, (ii) detect, by applying the machine learning model that predicts when the candidate distributed unit will shut down, that a specific distributed unit will experience a specific failure, and (iii) perform, in response to detecting that the specific distributed unit will experience the specific failure, a remedial action that addresses the specific failure. Related systems and computer-readable mediums are further disclosed.

14 Claims, 13 Drawing Sheets

(56) References Cited

U.S. PATENT DOCUMENTS

| | | | |
|---|---|---|---|
| 2022/0417109 | A1 | 12/2022 | Vulgarakis Feljan et al. |
| 2023/0091638 | A1 | 3/2023 | Medithe et al. |
| 2024/0022923 | A1 | 1/2024 | Arora et al. |
| 2024/0056842 | A1 | 2/2024 | Masood et al. |
| 2024/0064536 | A1 | 2/2024 | Mathews et al. |
| 2024/0098568 | A1 | 3/2024 | Curic et al. |
| 2024/0113932 | A1 | 4/2024 | Castrogiovanni et al. |
| 2024/0414045 | A1 | 12/2024 | Zacks et al. |
| 2025/0254543 | A1 | 8/2025 | Abu-Suleiman et al. |

OTHER PUBLICATIONS

Chandran et al., "Open Radio Access Network Maintenance Applications," U.S. Appl. No. 18/213,207, filed Jun. 22, 2023 (53 Pages).

* cited by examiner

OPEN RADIO ACCESS NETWORK MAINTENANCE APPLICATIONS

BRIEF SUMMARY

This disclosure is generally directed to open radio access network maintenance applications. In one example, a method may include (i) building, based on telemetry data from an open radio access network, a machine learning model that predicts when a candidate distributed unit within the open radio access network will experience a failure, (ii) detecting, by applying the machine learning model that predicts when the candidate distributed unit will shut down, that a specific distributed unit will experience a specific failure, and (ii) performing, in response to detecting that the specific distributed unit will experience the specific failure, a remedial action that addresses the specific failure.

In some examples, the remedial action comprises gracefully shutting down the specific distributed unit by handing over at least one telephone call to another distributed unit.

In some examples, the machine learning model specifies a root cause for the specific failure and specifies the remedial action to be performed in response to the root cause.

In some examples, gracefully shutting down the specific distributed unit comprises toggling a graceful shutdown flag that triggers a handover procedure for handing over telephone calls to another distributed unit.

In some examples, the handover procedure prioritizes emergency telephone calls over non-emergency calls.

In some examples, the remedial action comprises preventing the specific distributed unit from accepting inbound telephone calls during a period of gracefully shutting down.

In some examples, the remedial action comprises determining that a graceful shutdown of the specific distributed unit is not available, and then sending a notification to a network operations center system requesting a prioritized technician dispatch to remediate the specific distributed unit.

In some examples, the telemetry data comprises at least two of performance management data, fault management data, and log data.

In some examples, the telemetry data is continuously streamed from the open radio access network to a centralized data platform.

In some examples, a radio access network intelligent controller applies the machine learning model to detect that the specific distributed unit will experience the specific failure.

A corresponding system may include a physical computing processor and a non-transitory computer-readable medium encoding instructions that, when executed by the physical computing processor, cause a computing device to perform operations comprising (i) building, based on telemetry data from an open radio access network, a machine learning model that predicts when a candidate distributed unit within the open radio access network will experience a failure, (ii) detecting, by applying the machine learning model that predicts when the candidate distributed unit will shut down, that a specific distributed unit will experience a specific failure, and (ii) performing, in response to detecting that the specific distributed unit will experience the specific failure, a remedial action that addresses the specific failure.

A non-transitory computer-readable medium may encode instructions that, when executed by at least one physical processor of a computing device, cause the computing device to perform operations comprising (i) building, based on telemetry data from an open radio access network, a machine learning model that predicts when a candidate distributed unit within the open radio access network will experience a failure, (ii) detecting, by applying the machine learning model that predicts when the candidate distributed unit will shut down, that a specific distributed unit will experience a specific failure, and (ii) performing, in response to detecting that the specific distributed unit will experience the specific failure, a remedial action that addresses the specific failure.

Another example method may include (i) detecting that a software package has become available to be applied within an open radio access network, (ii) detecting, through autonomous monitoring of the open radio access network, that utilization at a set of telecommunications sites is sufficiently low to trigger graceful shutdown and upgrade procedures, (iii) shutting down gracefully the set of telecommunications sites by handing over at least one call to another telecommunications site servicing a common area, (iv) upgrading autonomously the set of telecommunications sites by applying the software package to the open radio access network after shutting down gracefully the set of telecommunications sites.

In some examples, the operations may further include restoring the set of telecommunications sites to active functionality in a manner that avoids dropping at least one telephone call.

In some examples, the operations may further include executing a sorting algorithm to sort the set of telecommunications sites from a larger set of telecommunications sites due to members of the set of telecommunications sites having at least one common characteristic.

In some examples, the at least one common characteristic comprises a common time window during which members of the set of telecommunications sites indicate a level of utilization below a threshold level.

In some examples, gracefully shutting down the set of telecommunications sites comprises toggling a graceful shutdown flag that triggers a handover procedure for handing over telephone calls to another distributed unit.

In some examples, detecting, through autonomous monitoring of the open radio access network, that utilization at the set of telecommunications sites is sufficiently low to trigger graceful shutdown and upgrade procedures further comprises detecting that the set of telecommunications sites is not handling an emergency call.

In some examples, gracefully shutting down the set of telecommunications sites comprises preventing the set of telecommunications sites from accepting inbound telephone calls.

In some examples, detecting that utilization at the set of telecommunications sites is sufficiently low to trigger graceful shutdown and upgrade procedures is based on an analysis of telemetry data.

In some examples, the telemetry data is continuously streamed from the open radio access network to a centralized data platform.

In some examples, a radio access network intelligent controller upgrades autonomously the set of telecommunications sites by applying the software package to the open radio access network after shutting down gracefully the set of telecommunications sites.

A corresponding system may include a physical computing processor and a non-transitory computer-readable medium encoding instructions that, when executed by the physical computing processor, cause a computing device to perform operations comprising (i) detecting that a software package has become available to be applied within an open radio access network, (ii) detecting, through autonomous monitoring of the open radio access network, that utilization at a set of telecommunications sites is sufficiently low to trigger graceful shutdown and upgrade procedures, (iii) shutting down gracefully the set of telecommunications sites by handing over at least one call to another telecommunications site servicing a common area, (iv) upgrading autonomously the set of telecommunications sites by applying the software package to the open radio access network after shutting down gracefully the set of telecommunications sites.

A non-transitory computer-readable medium may encode instructions that, when executed by at least one physical processor of a computing device, cause the computing device to perform operations comprising (i) detecting that a software package has become available to be applied within an open radio access network, (ii) detecting, through autonomous monitoring of the open radio access network, that utilization at a set of telecommunications sites is sufficiently low to trigger graceful shutdown and upgrade procedures, (iii) shutting down gracefully the set of telecommunications sites by handing over at least one call to another telecommunications site servicing a common area, (iv) upgrading autonomously the set of telecommunications sites by applying the software package to the open radio access network after shutting down gracefully the set of telecommunications sites.

Another example method may include (i) building, based on telemetry data from an open radio access network, a machine learning model that matches performance indicator degradation signatures to respective known configuration solutions that predictably improve corresponding instances of performance degradation within the open radio access network, (ii) detecting that a specific performance indicator of the open radio access network has degraded, and (iii) perform, by applying the machine learning model in response to detecting that the specific performance indicator of the open radio access network has degraded, a corresponding solution indicated by the machine learning model such that the specific performance indicator is improved.

In some examples, the method further includes adjusting a configuration parameter to an updated value as part of a specific solution from the respective known configuration solutions.

In some examples, the method further includes monitoring the specific performance indicator prior to adjusting the configuration parameter and monitoring the specific performance indicator after adjusting the configuration parameter.

In some examples, the method further includes maintaining the configuration parameter at the updated value for a predetermined amount of time during which the specific performance indicator can be monitored.

In some examples, the method further includes detecting that the specific performance indicator is improved by comparing results of monitoring of the specific performance indicator prior to adjusting the configuration parameter with results of monitoring of the specific performance indicator after adjusting the configuration parameter.

In some examples, the corresponding solution indicated by the machine learning model is performed as part of a closed radio access network optimization loop.

In some examples, the machine learning model comprises a library of classifiers that classify telemetry data as matching one or more of the performance indicator degradation signatures to predict the respective known configuration solutions.

In some examples the telemetry data comprises at least two of performance management data, fault management data, and log data.

In some examples, the telemetry data is continuously streamed from the open radio access network to a centralized data platform.

In some examples, a radio access network intelligent controller performs, by applying the machine learning model in response to detecting that the specific performance indicator of the open radio access network has degraded, the corresponding solution indicated by the machine learning model such that the performance indicator is improved.

A corresponding system may include a physical computing processor and a non-transitory computer-readable medium encoding instructions that, when executed by the physical computing processor, cause a computing device to perform operations comprising (i) building, based on telemetry data from an open radio access network, a machine learning model that matches performance indicator degradation signatures to respective known configuration solutions that predictably improve corresponding instances of performance degradation within the open radio access network, (ii) detecting that a specific performance indicator of the open radio access network has degraded, and (iii) perform, by applying the machine learning model in response to detecting that the specific performance indicator of the open radio access network has degraded, a corresponding solution indicated by the machine learning model such that the specific performance indicator is improved.

A non-transitory computer-readable medium may encode instructions that, when executed by at least one physical processor of a computing device, cause the computing device to perform operations comprising (i) building, based on telemetry data from an open radio access network, a machine learning model that matches performance indicator degradation signatures to respective known configuration solutions that predictably improve corresponding instances of performance degradation within the open radio access network, (ii) detecting that a specific performance indicator of the open radio access network has degraded, and (iii) perform, by applying the machine learning model in response to detecting that the specific performance indicator of the open radio access network has degraded, a corresponding solution indicated by the machine learning model such that the specific performance indicator is improved.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
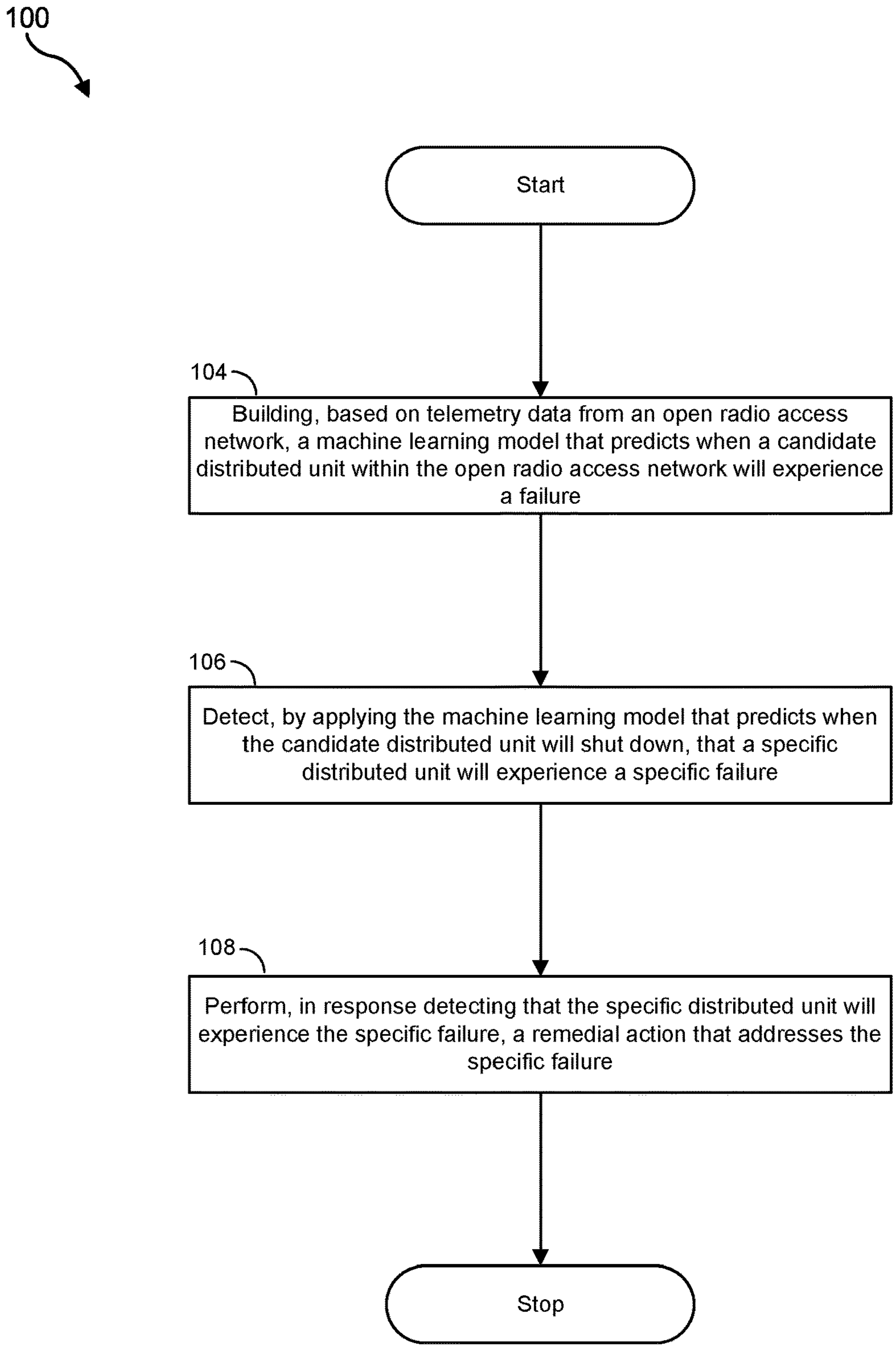
FIG. 1 shows a flow diagram for an example method relating to detecting that a distributed unit within a cellular network will experience a specific failure and performing a remedial action in response.

FIG. 1 shows a flow diagram for an example method 100 for performing a remedial action in response to detecting that a distributed unit within a cellular network may experience a specific failure. At step 104, one or more of the systems described herein may build, based on telemetry data from an open radio access network, a machine learning model that predicts when a candidate distributed unit within the open radio access network will experience a failure. At step 106, one or more of the systems described herein may detect, by applying the machine learning model that predicts when the candidate distributed unit will shut down, that a specific distributed unit will experience a specific failure. At step 108, one or more of the systems described herein may perform, in response to detecting that the specific distributed unit will experience the specific failure, a remedial action that addresses the specific failure.

Method 100 generally relates to addressing predictable failures of distributed units within a cellular service network and handling these predictable failures proactively and gracefully such that one or more telephone calls are prevented from being dropped. Method 100 can generally refer to automatic behavior recognition to gracefully handover users prior to a distributed unit completing graceful shutdown procedures, as described in more detail below.

When a distributed unit shuts down, the pods are terminated, the calls are dropped, and/or the distributed unit remains inactive until all of the pods come back and the cells are radiating. This disclosure reveals a mechanism whereby the distributed unit interprets failover intelligently based on an artificial intelligence and/or machine learning algorithm (e.g., based on preempted behavior seen in different markets in comparable situations). When such scenarios arise, the radio access network solution can move all of the users that are present on the distributed unit that is gracefully shutting down to another available distributed unit that is serving the same or an overlapping area. This can be referred to as proactive handling of calls prior to gracefully or abruptly shutting down, which can be performed in a manner that is planned or unplanned, such that no service interruption happens or such that service interruption is thereby minimized.

The following describes implementation details for achieving the performance of method 100. An algorithm can be developed over time so that the distributed unit learns from itself and/or from one or more other distributed units and their past behaviors when deployed throughout the country. Over time, the corresponding radio access network solution can gather information about failures and distributed unit shutdowns and then feed the information into a data repository. Network administrators could enable platform level logging and/or streaming northbound of telemetry data to generate one or more machine learning models. For example, an artificial intelligence model could be executed that analyzes the logs and checks for any known past issues or red flags that may have led to previously reported instances of distributed unit failures (i.e., according to log analytics).

In particular, a machine learning model can be built collecting the log data from the infrastructure level, the platform level, and/or the application level. The collected data could be sent to a central depository or the machine learning model can be built. Moreover, these machine learning models can be referenced by, and/or maintained by, an artificial intelligence model that is executing and that will continuously look at incoming telemetry data from all of the distributed units. The artificial intelligence model can match signatures from the incoming telemetry data against the library of machine learning models, which can be developed over time. The artificial intelligence model can try to match the signatures from previous events where a distributed unit failed and/or any abrupt distributed unit shutdown occurred. Based on this information, the artificial intelligence model can learn from past experiences gracefully handing over the users or active calls to another distributed unit before the primary distributed unit shuts down, thereby meeting the objective of not causing any instances of bad end-user experiences and/or dropped calls. Moreover, the artificial intelligence and/or machine learning models can furthermore help with planned distributed unit shutdown procedures before gracefully migrating one or more active users, as discussed in more detail below.

Figure 2:
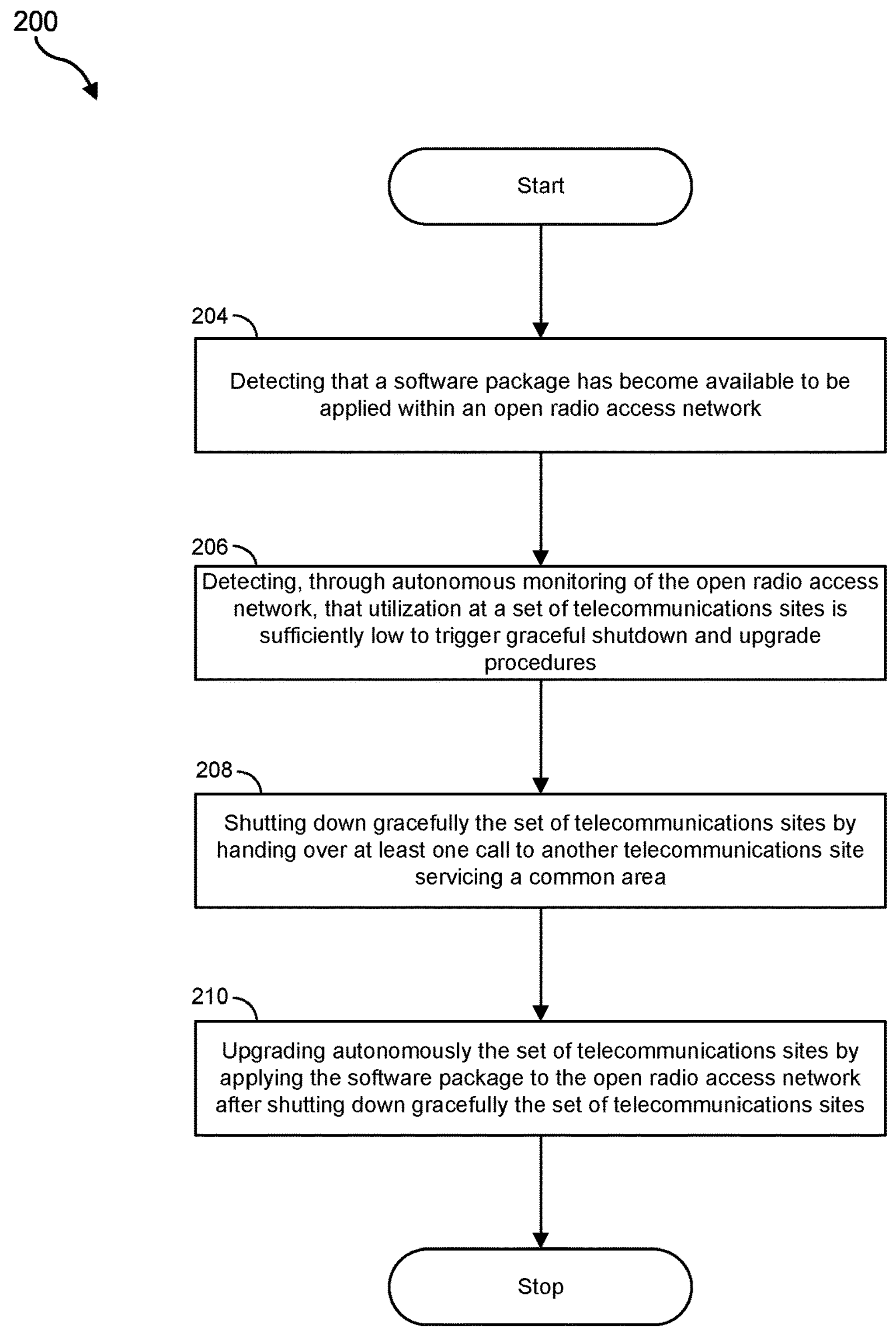
FIG. 2 shows a flow diagram for an example method relating to autonomous software package installation within an open radio access network.

FIG. 2 shows another flow diagram for an example method 200 for performing autonomous software installation in the context of an open radio access network. At step 204, one or more of the systems described herein may detect that a software package has become available to be applied within an open radio access network. At step 206, one or more of the systems described herein may detect, through autonomous monitoring of the open radio access network, that utilization at a set of telecommunications sites is sufficiently low to trigger graceful shutdown and upgrade procedures. At step 208, one or more of the systems described herein may shutdown gracefully the set of telecommunications sites by handing over at least one call to another telecommunications site servicing a common area. Lastly, at step 210, one or more of the systems described herein may upgrade autonomously the set of telecommunications sites by applying the software package to the open radio access network after shutting down gracefully the set of telecommunications sites. As used herein, the term "set of telecommunications sites" can refer to one or more telecommunications sites. Moreover, as used herein, the term "telecommunications site" can refer to an identity or location of a node, component, and/or virtual function, such as a distributed unit, within an open radio access network. Accordingly, "upgrading" a telecommunications site can refer to upgrading a particular virtual function associated with a telecommunications network. Furthermore, as used herein, the term "graceful shutdown" can refer to a shutdown of a component, such as a distributed unit, that is performed in a manner that prevents dropping at least one telephone call.

Returning to FIG. 2, in terms of graceful shutdown procedures, a cellular service provider can potentially have thousands of distributed units deployed. According to a related methodology, when the cellular service provider seeks to upgrade any of the distributed units, the cellular service provider may be required to go through one or more planned maintenance windows in order to perform the upgrade. Such upgrades can be performed in batches, such as 100 distributed units together at night, thereby doing upgrades for all of the distributed units over a series of nights. This disclosure describes technology that can leverage the same framework to provide a solution whereby the upgrades are not scheduled, as they are scheduled within the related methodology described above. Rather, the network administrators can dispose an intelligence layer within the open radio access network to effectively monitor various items of information regarding one or more distributed units, including potentially the utilization of each distributed unit, how much traffic each distributed unit is handling, whether each distributed unit is handling emergency calls, and/or whether each distributed unit is handling a call for high-priority users with strict service-level agreements, etc. The network administrators can then furthermore define policies in order to try to gracefully shut down the distributed unit whenever incoming data is fetched and indicates that the distributed unit is not too busy, thereby eliminating human intervention and/or eliminating the need to perform maintenance activities during maintenance windows only. Generally speaking, the technology of this disclosure and/or the performance of method 200 may enable the upgrading of the distributed unit at any time without being limited to a predefined maintenance window and/or with minimal or zero manual intervention.

Figure 3:
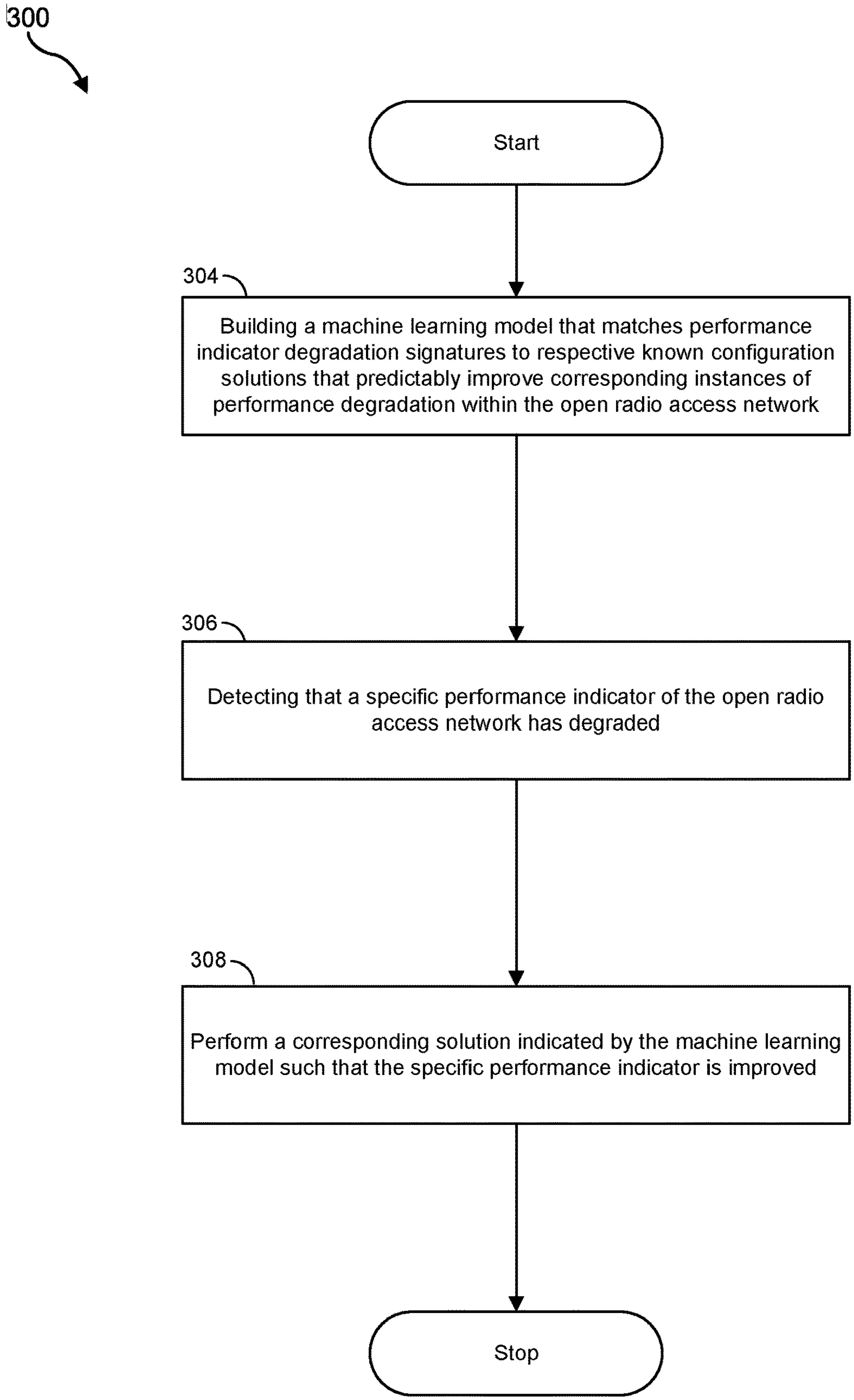
FIG. 3 shows a flow diagram for an example method relating to improving performance indicators through machine learning technology.

FIG. 3 shows another flow diagram for an example method 300 for improving one or more performance indicators for an open radio access network through the application of machine learning technology. At step 304, one or more of the systems described herein may build, based on telemetry data from an open radio access network, a machine learning model that matches performance indicator degradation signatures to respective node configuration solutions that predictably improve corresponding instances of performance degradation within the open radio access network. At step 306, one or more of the systems described herein may detect that a specific performance indicator of the open radio access network has degraded. Lastly, at step 308, one or more of the systems described herein may perform, by applying the machine learning model in response to detecting that the specific performance indicator of the open radio access network has degraded, a corresponding solution indicated by the machine learning model such that the specific performance indicator is improved. As used herein, the term "performance indicator degradation signature" generally refers to any signature or identified hallmark or indicator that predicts, correlates with, or otherwise indicates that a corresponding performance indicator is degrading.

FIGS. 1-3 provide a broad overview of example methods described herein. Additionally, the remaining figures provide addition context regarding implementation details and/or additionally embodiments corresponding to these example methods, as discussed in more detail below.

Figure 4:
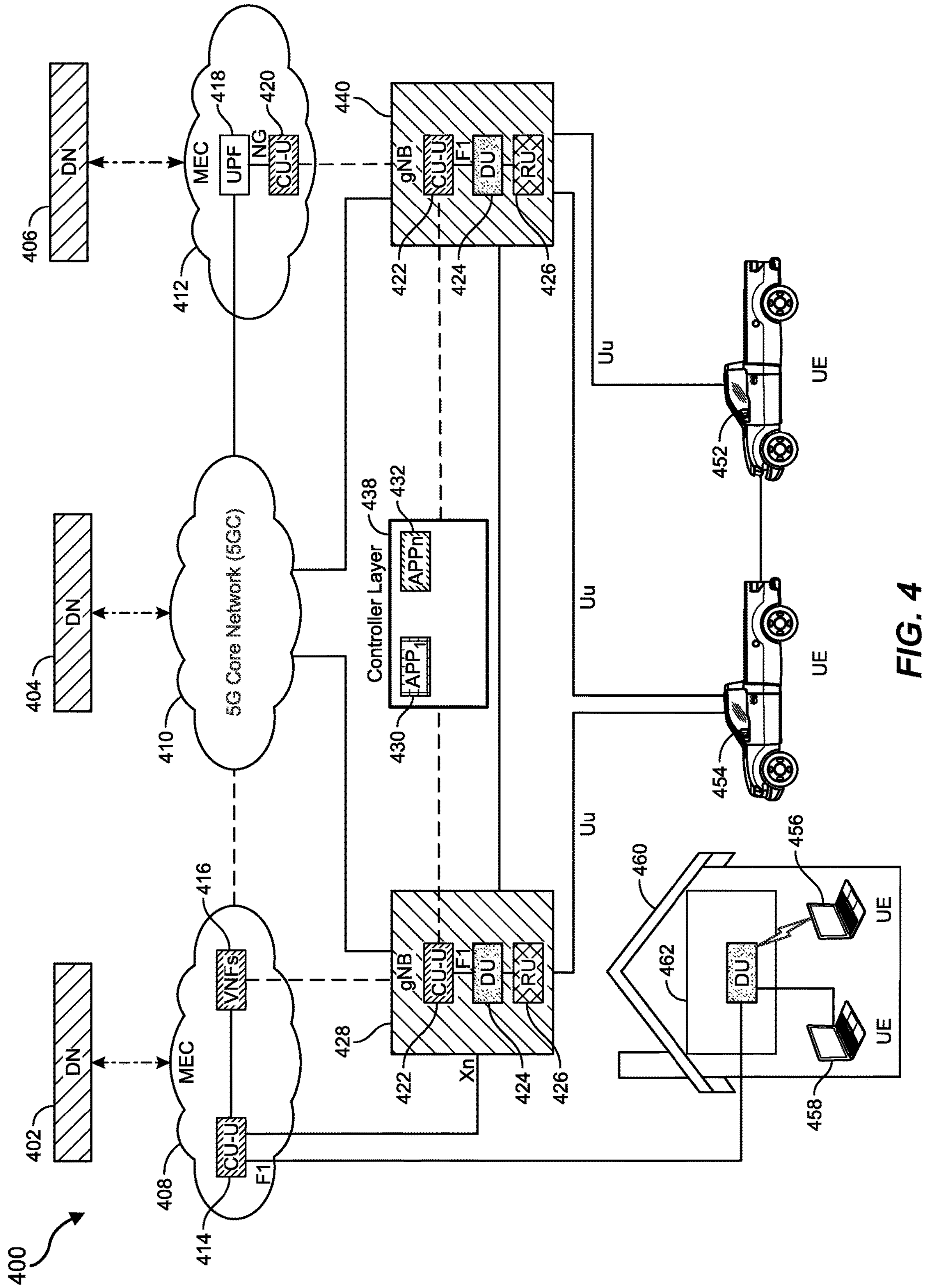
FIG. 4 shows a diagram of an example 5G cellular network.

For context, FIG. 4 shows a diagram 400 of an example 5G network architecture. As further shown in this figure, diagram 400 may further include a data network 402, a data network 404, and a data network 406, as well as a mobile edge computing unit 408, mobile edge computing unit 412, and a 5G core network 410. The two instances of the mobile edge computing unit may further include a respective centralized unit 414 and a centralized unit 420, as well as virtual functions 416, and the user plane function 418. The mobile edge computing units may further communicate with a gNB 428 and a gNB 440. Each GNB may further include an instance of a centralized unit 422, an instance of a distributed unit 424, and an instance of a radio unit 426. Additionally, diagram 400 further illustrates how the corresponding network architecture may further include a controller layer 438, which can further include one or more applications 430-432. Diagram 400 also further illustrates how GNB 428 and GNB 440 may further communicate with a household 460, an automobile 454, and an automobile 452. Household 460 may further include a distributed unit 462, which may further provide network connectivity to a user equipment 458 and a user equipment 454.

Within a 5G architecture, one or more instances of the centralized unit, the distributed unit, and the radio unit may together coordinate to implement the corresponding 5G cellular network. These units can be included within the overall network infrastructure and can coordinate together to provide network connectivity, data transmission, and/or voice communications.

The centralized unit can also be referred to as the Centralized Baseband Unit (C-BBU) or Centralized Unit (CU). The centralized unit can be responsible for processing and managing various control plane functions of the network. The centralized unit can function as a central hub for the providing of control signals, coordinating of resources, and facilitating of interactions between multiple distributed units and radio units. The centralized unit can also function as a central point of control for the entire network.

The centralized unit can be located within a base station or within a central data center, and the centralized unit can handle responsibilities such as management of radio resources, mobility management, establishment of connections, and optimizing of the overall cellular network. The centralized unit can coordinate with the core network and facilitate the performance of tasks such as authenticating users, enforcing policy, and managing traffic. The centralized unit can be designed or configured to process network traffic from a significant number of connected devices and then allocate network resources accordingly.

The distributed unit can process and/or manage one or more user plane functions of the corresponding cellular network. The distributed unit can process data plane traffic and/or other user data. In some examples, the distributed unit can be disposed nearby one or more radio units to help improve network performance.

The distributed unit can coordinate with the centralized unit and perform functions such as modulation/demodulation, encoding/decoding, error correction, and packet routing. The distributed unit can function as an interface between the centralized unit and the radio units, relaying control signals and forwarding user data. The distributed unit can be geographically distributed to serve specific areas or cell clusters, allowing for efficient resource allocation, and load balancing.

The radio unit, also known as the Remote Radio Head (RRH) or Remote Radio Unit (RU), can be responsible for transmitting and receiving radio signals to and from the user devices. The radio unit can handle lower level physical layer functions and can provide wireless coverage and connectivity within a specific cell or coverage area. The radio unit can be located at the edge of the network, closer to the end-users.

The radio unit can be responsible for tasks such as radio frequency (RF) signal generation, amplification, modulation, demodulation, and beamforming. The radio unit can communicate with the distributed unit to exchange control and user plane data. The radio unit can be deployed on rooftops, poles, or other suitable locations to maximize coverage and signal strength.

The relationship between these units can be illustrated as follows: User Device←(Wireless Connection)→Radio Unit←(Wired Connection)→Distributed Unit←(Wired Connection)→Centralized Unit↔Core Network.

This hierarchical architecture allows for efficient resource management, scalability, and flexibility in the 5G network. It enables centralized control and coordination while distributing the processing tasks closer to the network edge, thereby potentially resulting in improved performance, reduced latency, and/or an enhanced user experience.

Figure 5:
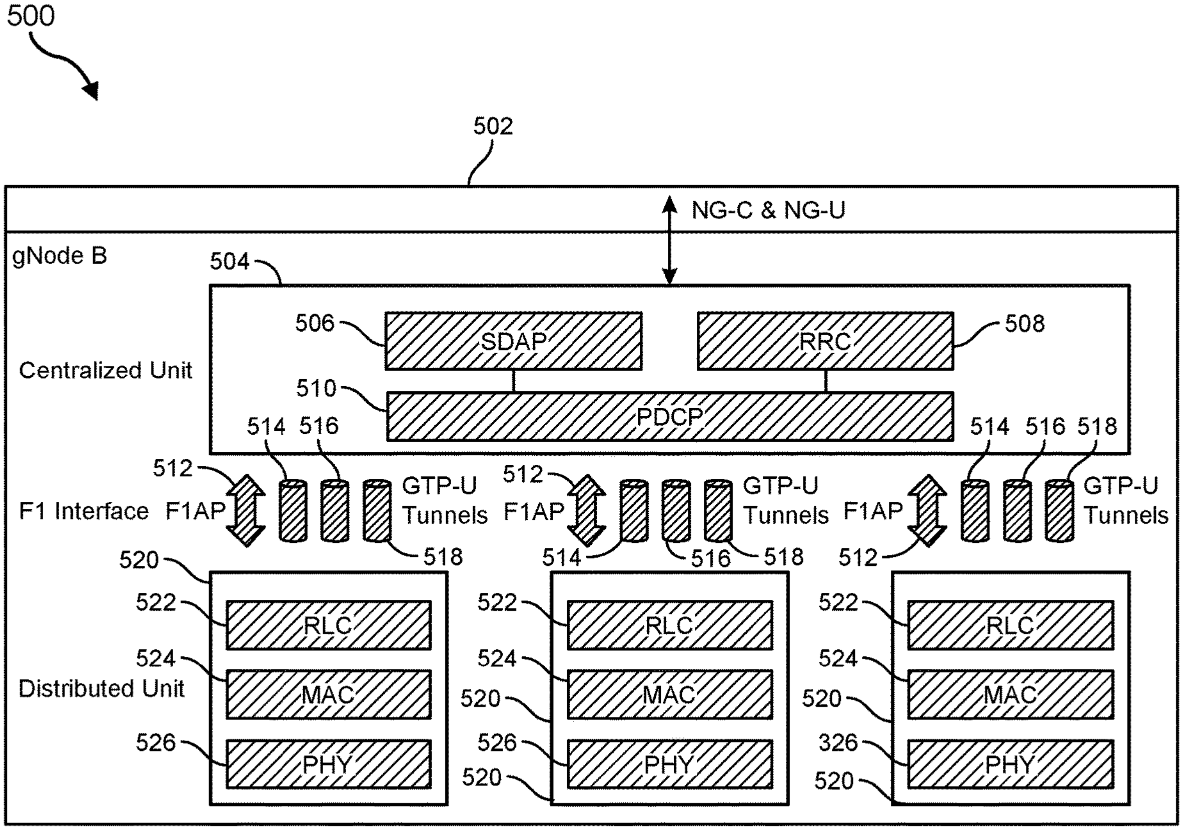
FIG. 5 shows a diagram of an example distributed unit and centralized unit in the context of a 5G cellular network.

For additional context, FIG. 5 shows another diagram 500 that helps to illustrate the internal components of a respective gNode B 502. As further shown in this figure, gNode B 502 may further include a centralized unit 504 and three instances of a distributed unit 520. Centralized unit 504 may further include a Service Data Adaption Protocol component 506, a Radio Resource Control Unit 508, and a Packet Data Convergence Protocol Component 510. Each instance of the distributed unit may further include a radio link control component 522, a media access control component 524, and a physical layer component 526. Those having skill in the art will understand that these respective components correspond to different layers within a hierarchical network model. Each distributed unit may communicate with the centralized unit through instances of an F1AP communication channel 512 and/or one or more instances of GTP-U tunnels 514, 516, and 518, as further shown in this diagram.

In view of the above contextual information, this disclosure further describes technology that may address problems or deficiencies arising within the context of 5G and other cellular service networks. In particular, the various maintenance applications described in this disclosure may help to address scenarios whereby one or more components or virtual functions of the cellular network experiences a failure or otherwise fails to fully provide network service to customers. The various maintenance applications described in this disclosure may also help to address performance indicator degradation over time, and this disclosure further describes machine learning technology that may address these instances of degradation and provide solutions that improve or restore values for these performance indicators, as discussed further below.

Figure 6:
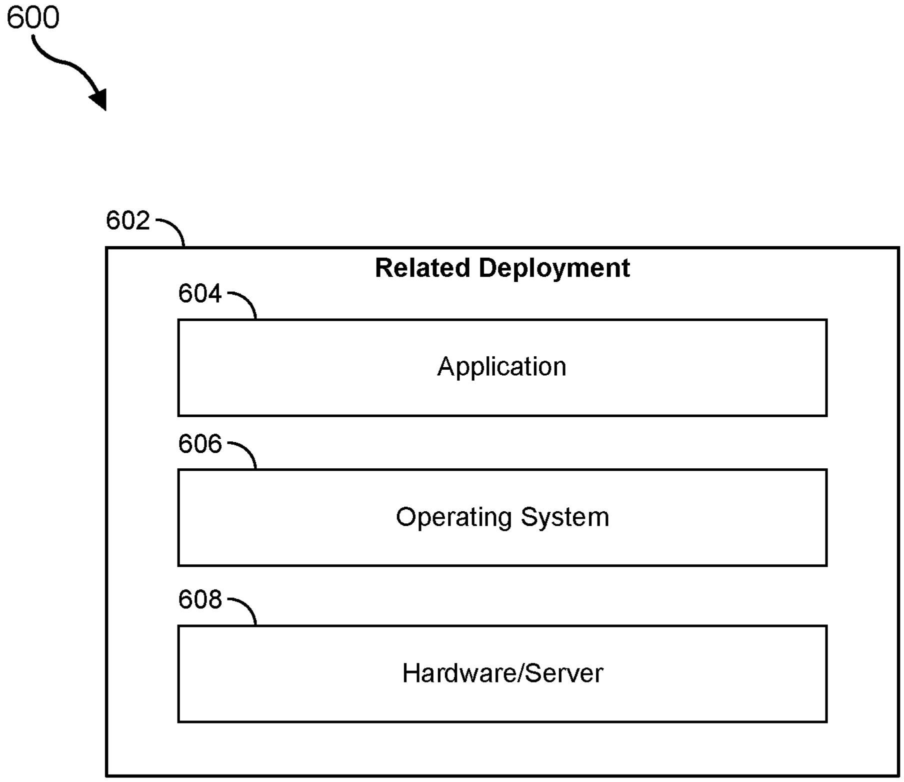
FIG. 6 shows a block diagram of a related computing system deployment for implementing a cellular service network.
Figure 7:
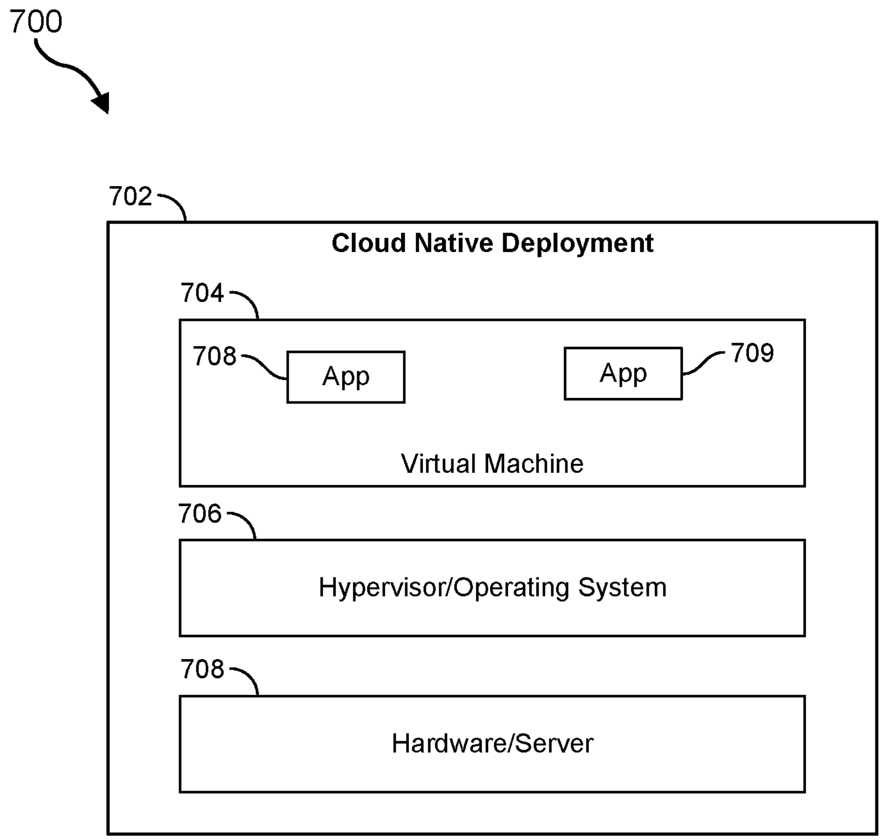
FIG. 7 shows, by way of comparison, a block diagram of a cloud native deployment for implementing a cellular service network.

The following provides an overview, in connection with FIG. 6 and FIG. 7, of graceful shutdown functionality. In the context of a cloud radio access network deployment, centralized unit software and distributed unit software can execute on a virtualization platform. As shown in FIG. 7, with virtualization deployments, there can be a dependency on multiple stacks at the infrastructure level such as physical servers. In addition to this infrastructure level, there can also be a platform stack that runs on top of the infrastructure level, in terms of a hypervisor and/or Kubernetes. In particular, FIG. 7 shows a diagram 700 in which a cloud native deployment 702 may include a virtual machine 704 executing an application 708 and an application 709. Cloud native deployments 702 may also further include a hypervisor/operating system 706, as well as a hardware/server layer 708. Cloud native deployments thereby contrast with the related deployment 602 shown in diagram 600 of FIG. 6. As further shown in this figure, related deployment 602 may further include an application 604, an operating system 606, and a hardware/server component 608, but without necessarily including any virtualization functionality.

More specifically, diagram 700 contrasts with diagram 600 due to the fact that, in diagram 600, each one of application 604, operating system 606, and/or hardware/server 608 may originate from the same vendor and, therefore, have the same less frequent upgrading cycle or cadence. In contrast, in diagram 700, each of the following may originate from different vendors: (i) application 708, (ii) application 709, (iii) virtual machine 704 and/or hypervisor/operating system 706, and/or (iv) hardware/server layer 708. In view of the heterogeneous nature of these different vendors providing components shown within diagram 700, there can be an increased frequency and/or cadence of corresponding upgrade procedures, thereby resulting in a desire for improved methodologies for handling these upgrade procedures, as discussed in more detail below.

Returning to FIG. 7, a containerized version of the centralized unit and/or distributed unit can be executed above hypervisor/operating system 706 in order to create an overall virtualization environment. Nevertheless, with such multiple layer deployments, there can be different cadences with respect to different vendors applying one or more updates to corresponding components. For example, one vendor might come up with new BIOS settings and another vendor might come up with a software cycle with new supported features. Additionally, distributed unit software from the vendors can have its own release cycles. When one or more of these new features arises, network administrators may go through a process of testing and validation in a cluster of sites before rolling out the new features into production. In order to achieve this, the network administrators may flag the distributed unit to indicate that there will be a downtime for upgrading one or more of the stacks. When the flag is enabled, the corresponding radio access network can start gracefully handing over the calls from one distributed unit originally handling the calls to another distributed unit that is serving the same area. Once all the telephone calls have been migrated or handed over to one or more other distributed units serving the same area, the network administrators can begin upgrading the software in one or more of the stacks. As used herein, the term "telephone calls" can refer to any Internet-enabled or other voice calls, including emergency and non-emergency calls. During this process, there can be a downtime depending on the size of the upgrade. Once the distributed unit is upgraded, it becomes ready to start taking up telephone calls again. By doing this, the network administrators potentially avoid bad user experiences in terms of dropped calls.

Figure 8:
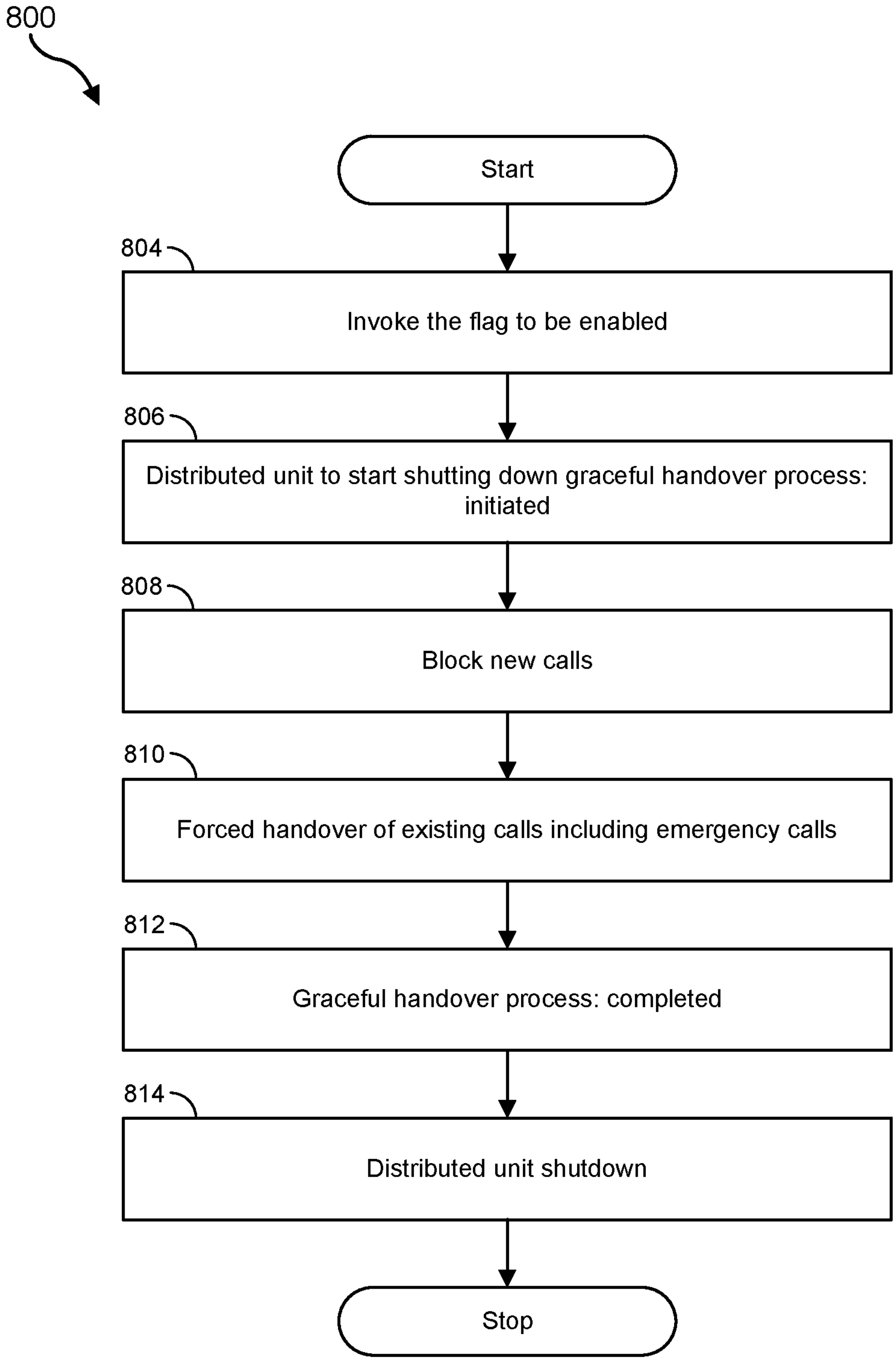
FIG. 8 shows a flow diagram for another example method relating to graceful distributed unit shutdown procedures.

FIG. 8 shows a flow diagram for an example method 800 for performing graceful shutdown procedures, which can be performed as part of method 100, method 200, and/or method 300, as further discussed above. At step 804, one or more of the systems described herein may invoke the graceful shutdown flag to be enabled. In the example of this figure, a particular flag (e.g., a bit stored within memory) may be toggled to trigger the performance of graceful shutdown procedures. Additionally, or alternatively, in other embodiments a different or equivalent mechanism may be used as a substitute for the graceful shutdown flag. For example, an intelligence layer or radio access network intelligent controller may simply command the initiation and/or performance of graceful shutdown procedures, without necessarily toggling a bit in memory that can subsequently be monitored and detected as the trigger for the performance of these procedures.

At step 806, the distributed unit may initiate graceful shutting down by first performing graceful handover procedures that handover one or more existing telephone calls to another distributed unit in the same area and/or covering a comparable area. Moreover, although the example of this figure focuses on a distributed unit, those having skill in the art will understand that essentially the same graceful shutdown procedures may be performed with respect to any other suitable node, virtual function, and/or other component of a cellular network.

At step 808, one or more of the systems described herein may block new calls to the distributed unit that is in the process of graceful shutdown procedures. Blocking new calls may minimize disturbance to the distributed unit while allowing the distributed unit to further approach and reach a situation in which the distributed unit is handling zero calls and can therefore be fully shut down (e.g., to prevent an expected failure according to method 100 or to apply an upgrade according to method 200).

At step 810, one or more of the systems described herein may force handover of existing calls, which may furthermore include emergency calls. At step 812, the graceful handover process may be completed such that all of the telephone calls that were previously handled by the distributed unit that is undergoing graceful shutdown procedures have been successfully handed over to another alternative distributed unit, which can cover the same area or a comparable area.

At step 814, the process of shutting down the distributed unit may be finalized such that the distributed unit is turned off, powered down, and/or disabled in a manner that prevents an expected failure scenario (see method 100) and/or that enables the application of an upgrade in a dynamic, non-scheduled manner and/or outside of a pre-scheduled maintenance window (see method 200). After the performance of step 814, method 800 may finish.

The steps of method 800 do not necessarily need to be performed in the exact same order as shown within this figure. Rather, any suitable order may be used in a manner that achieves effectively the same beneficial results of the graceful shutdown procedures. As one illustrative example, step 808 of blocking new calls can be performed optionally before and/or after step 810 of forcing handover of existing calls including emergency calls.

Figure 9:
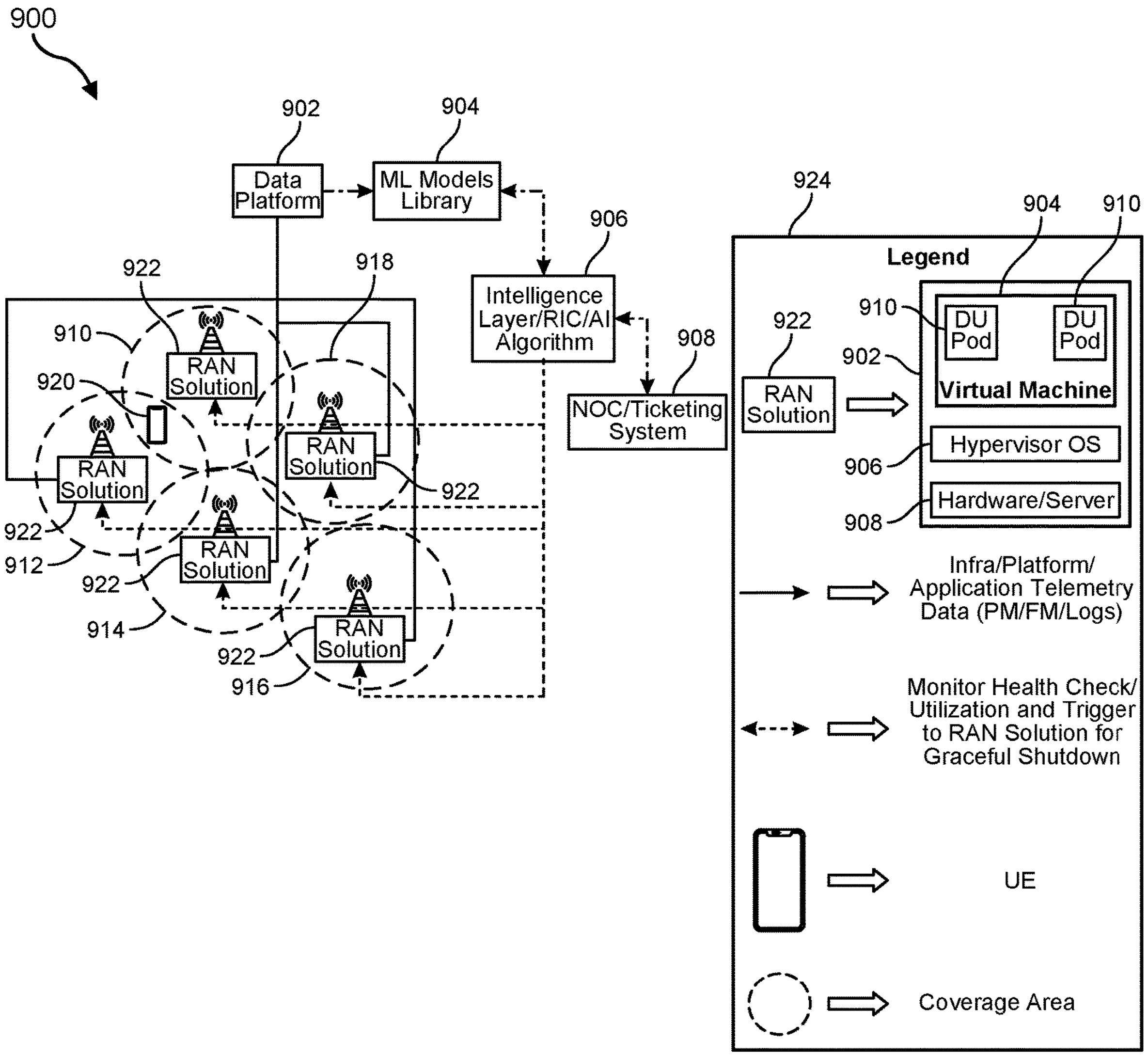
FIG. 9 shows a diagram illustrating distributed unit handover procedures across different coverage areas.

FIG. 9 shows a diagram 900 that helps to illustrate the interactivity between different components of a cellular service that includes multiple distinct radio access network solutions. As further shown in legend 924, each radio access network solution 922 can be decomposed into a radio access network solution 902 that further includes one or more instances of a distributed unit pod 910. The distributed pods can execute within a virtual machine 904. Below the virtual machine, as further shown in this diagram, may be disposed a hypervisor or operating system 906 and/or a hardware/server layer 908 (see also FIG. 7 for comparison). Diagram 900 also further illustrates how, in the example of this figure, one or more instances of a radio access network solution 922 can correspond to different vicinities or coverage areas, including a coverage area 918, a coverage area 916, a coverage area 914, a coverage area 912, and a coverage area 910. Diagram 900 helps illustrate how these different instances of coverage areas may potentially overlap. For example, in this particular figure an instance of user equipment 920 is disposed within the overlapping cross-section between coverage area 910 and coverage area 912. Accordingly, if one of the distributed units disposed within these two separate radio access network solutions is to be shut down (e.g., according to method 100 and/or method 200), then the graceful handover procedures may effectively handover calls to another distributed unit within the same radio access network solution (i.e., if one is available and coverage is appropriate) and/or within the other one of the radio access network solutions covering the overlapping area in which the user equipment is disposed.

Diagram 900 also helps to further illustrate how the various methods, methodologies, and/or techniques described within this disclosure may be performed by one or more components shown, including a data platform 902, a machine learning models library 904, an intelligence layer/radio access network intelligent controller/artificial intelligence algorithm 906, and/or a network operating center/ticketing system 908. In particular, data platform 902 may continuously or otherwise receive telemetry data from one or more instances of the corresponding radio access network solution. The telemetry data can include any suitable permutation of performance management data, fault management data, and log data. From this incoming telemetry data, intelligence layer 906 may construct machine learning models library 904, which can facilitate the performance of method 100, method 200, and/or method 300, as further discussed above. Moreover, in any cases of candidate graceful shutdown procedures in which the actual graceful shutdown procedure cannot be performed and/or the graceful shutdown procedure is not sufficient to resolve all remaining issues and instead a specialized technician can be invoked, the network operating center/ticketing system 908 may be notified accordingly, which can generate a corresponding ticket to indicate a high-priority request for a technician to arrive on premises and resolve one or more remaining issues manually, as further discussed above.

Figure 10:
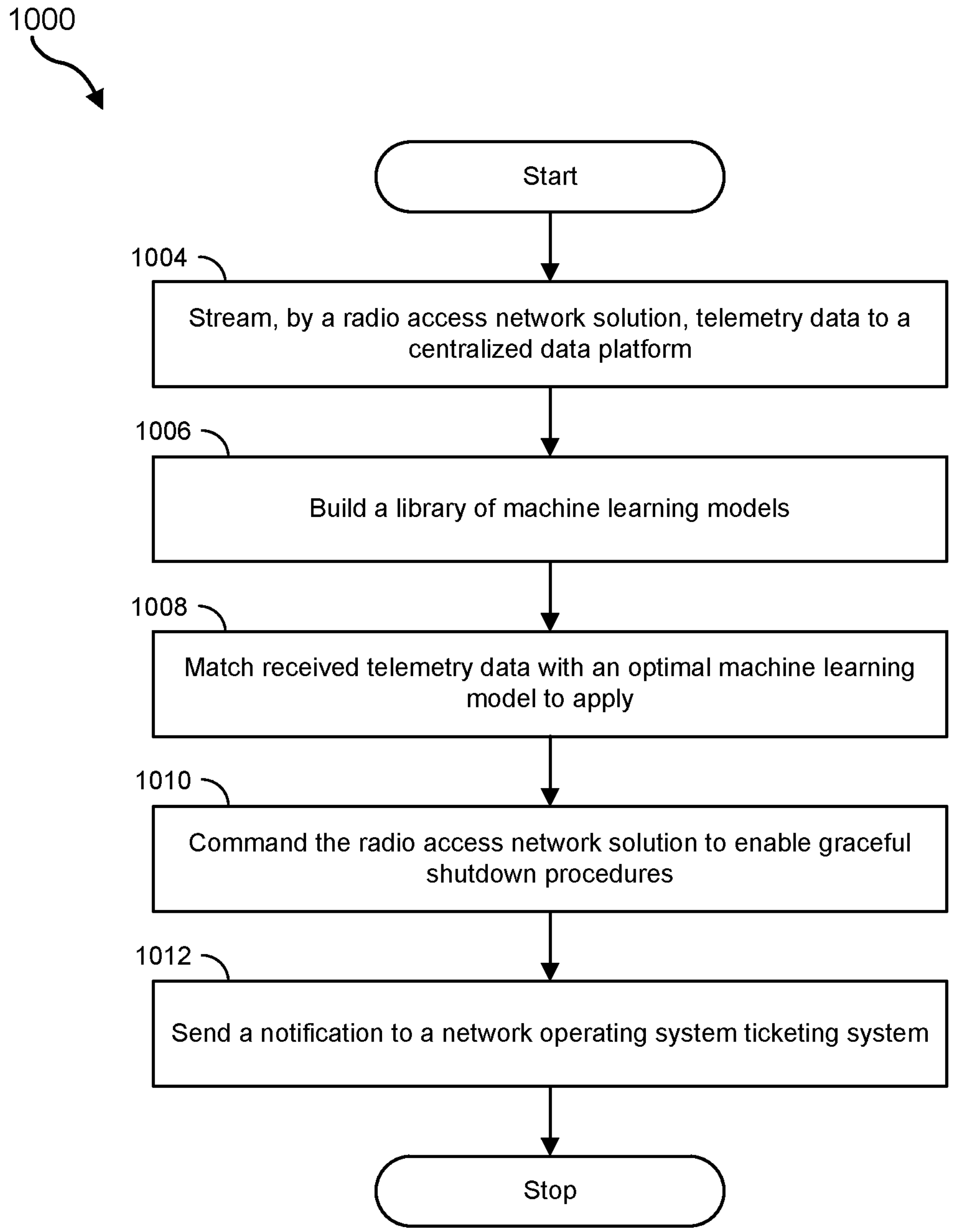
FIG. 10 shows another flow diagram for an example method for graceful distributed unit shutdown procedures.

FIG. 10 shows a flow diagram for an example method 1000 that corresponds to a varying and/or more detailed version of method 100. At step 1004, a radio access network solution may stream telemetry data to a centralized data platform. For example, one or more of the instances of a radio access network solution 922 shown within diagram 900 may stream telemetry data to data platform 902. At step 1006, one or more of the systems described herein may build a library of machine learning models. For example, intelligence layer/radio access network intelligent controller/artificial intelligence algorithm 906 may construct machine learning models library 904. The machine learning models of method 100 and/or method 1000 may be based on characteristics that include the root cause of a distributed unit shut down and/or one or more remedial actions to apply in response to prediction or detection of an expected failure. At step 1008, one or more of the systems described herein may match received telemetry data with an optimal machine learning model to apply. For example, radio access network intelligent controller 906 may perform step 1008. In response, at step 1010, one or more of the systems described herein may command the radio access network solution to enable graceful shutdown procedures. For example, radio access network intelligent controller 906 may command a corresponding radio access network solution, and/or one or more subcomponents within such a solution, such as a distributed unit, to enable graceful shutdown procedures, which can be performed according to method 800, for example. Lastly, at an optional step 1012, a notification may be transmitted to a network operating center ticketing system, such as network operating center/ticketing system 908 shown within diagram 900. Step 1012 may be performed in the case that the graceful shutdown procedures are not sufficient to resolve all remaining issues affecting the radio access network solution and/or distributed unit, as further discussed above.

Figure 11:
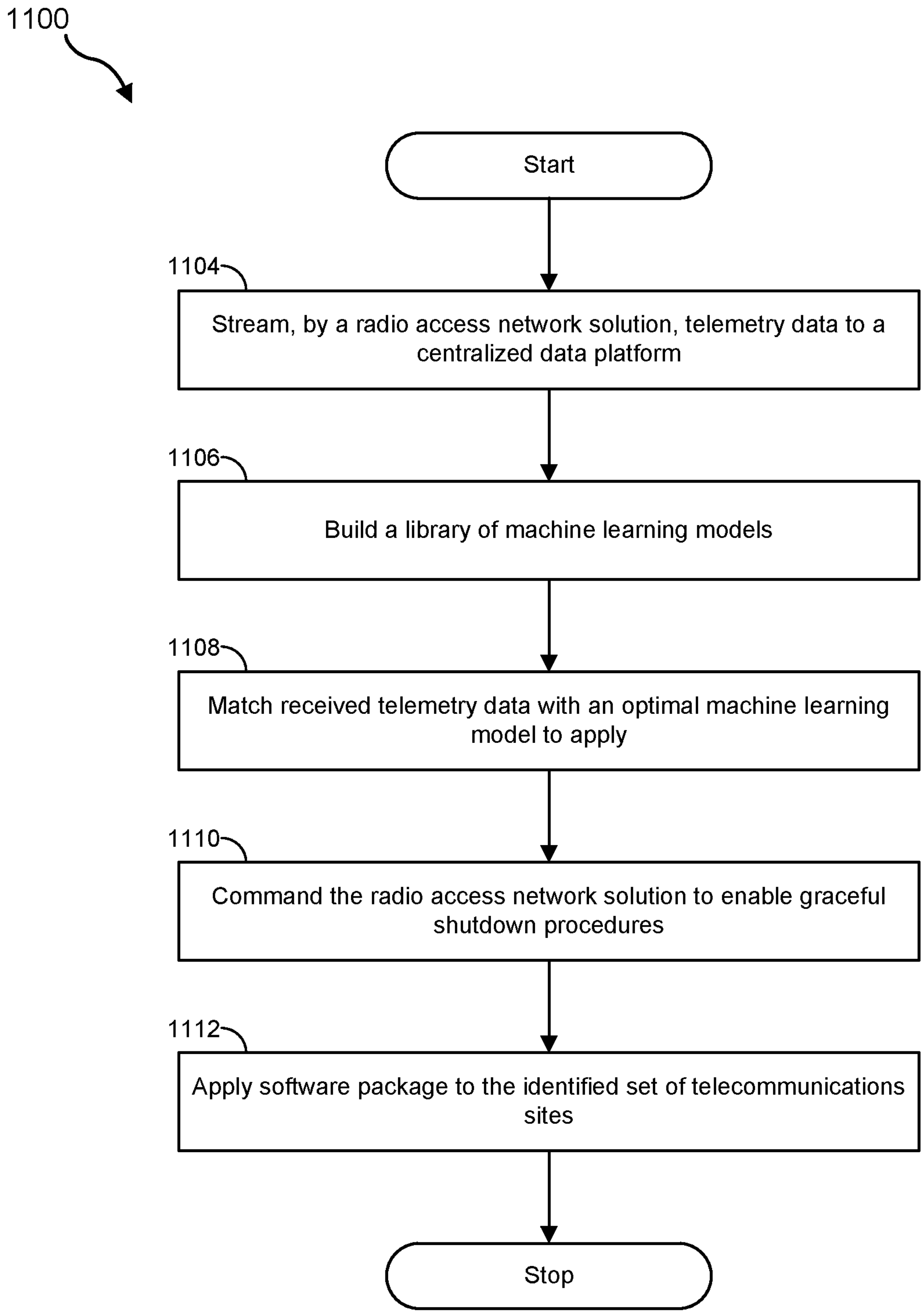
FIG. 11 shows another flow diagram for an example method relating to autonomous software package installation within an open radio access network.

FIG. 11 shows a flow diagram for an example method 1100 that corresponds to a varying and/or more detailed version of method 200. Steps 1104-1110 generally parallel the corresponding steps of method 1000, as further discussed above. In the context of step 1106, the machine learning models of method 1100 may be based on characteristics including traffic utilization at a particular site during different times of the day. Accordingly, these machine learning models may enable different groups of sites to be created with similar characteristics. By way of illustrative example, sites having low utilization during morning time could be aggregated together as one group. Additionally, or alternatively, another group of sites with low utilization during the evening time could be aggregated together as another group.

In other words, rather than using machine learning to identify signatures from telemetry data that successfully predict future distributed unit shutdowns or failures, as with method 100 and/or method 1000, method 1100 may additionally, or alternatively, leverage the technology of machine learning to sort, aggregate, filter, and/or classify one or more sets of telecommunication sites such that a software package may be applied to different members within each set concurrently and/or as a batch, after each of the members of a particular site has performed graceful shutdown procedures, as discussed above and/or consistent with method 800. Generally speaking, the methodology of method 1100 may leverage machine learning technology to group telecommunication sites together, in an intelligent manner, such that the telecommunication sites can be upgraded in a batch.

Although not explicitly shown within the flow diagram of method 1100, this method may further include, at any suitable point, an implicit step of detecting a new software package to be applied to a corresponding radio access network solution, consistent with method 200 as described above. Accordingly, after the performance of steps 1104-1110, method 1100 may conclude with a step 1112 of applying the software package to the identified set of sites that were previously shutdown according to step 1110. As appropriate, method 1100 may also include an optional step of sending a notification to a corresponding network operation center or ticketing system, as further discussed above. Furthermore, method 1100 may also conclude with an optional step (not shown in FIG. 11) of restoring the set of telecommunications sites to active functionality in a manner that avoids dropping at least one telephone call.

Figure 12:
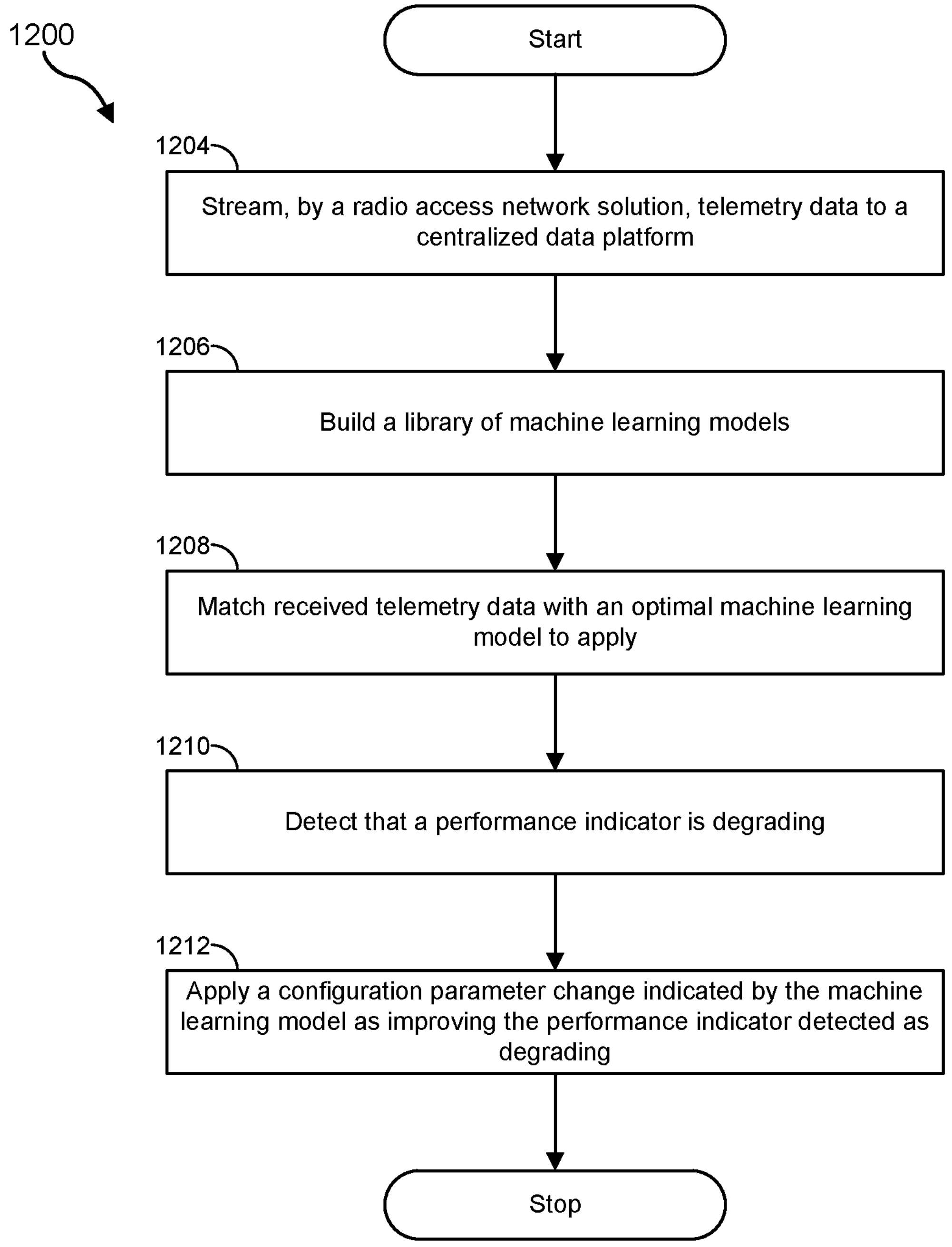
FIG. 12 shows a flow diagram for an example method relating to improving performance indicators through machine learning technology.

FIG. 12 shows another flow diagram for an example method 1200 that corresponds to a varying and/or more detailed version of method 300. As further shown in this figure, method 1200 may begin with steps 1204-1208, which may generally parallel the corresponding steps of method 1000 and method 1100, as further discussed above. Whereas method 1000 may have leveraged machine learning to detect, predict, and/or address distributed unit failure, and method 1200 may have leveraged machine learning to appropriately sort and/or group different telecommunications sites, method 1200 may instead leverage machine learning to develop a library of classifiers that detect or predict performance indicator degradation and furthermore that apply or specify more narrowly tailored configuration parameter changes to address the performance indicator degradation and improve the corresponding performance indicator. In other words, the machine learning model of method 1200 can include a library of classifiers that classify telemetry data as matching one or more of the performance indicator degradation signatures to predict the respective known configuration solutions. Because these configuration parameter changes do not necessarily require shutting down of a distributed unit and/or other radio access network component, this optional step is not shown within FIG. 12.

Generally speaking, when there is degradation in any one of multiple different performance indicators, including key performance indicators, a corresponding configuration parameter change can be attempted. The attempted configuration parameter change can be performed by an intelligence layer or radio access network intelligent controller. The attempted change can be soaked for a specific or predetermined time during which corresponding performance indicators can be monitored. The values of these performance indicators can be compared in terms of the values before and the values after application of the configuration parameter change. In other words, as part of the process of building corresponding machine learning models, method 1200 may further include adjusting a configuration parameter to an updated value as part of a specific solution from the respective known configuration solutions. In these examples, method 100 may also further include monitoring the specific performance indicator prior to adjusting the configuration parameter and monitoring the specific performance indicator after adjusting the configuration parameter. Subsequently, method 1200 may furthermore include maintaining (i.e., soaking) the configuration parameter at the updated value for a predetermined amount of time during which the specific performance indicator can be monitored.

In the case that the configuration parameter change improves the performance indicator, a machine learning model can be built, and this machine learning model can be based on characteristics including performance indicator impact and/or the proposed configuration parameter change that improved the performance indicator. Subsequently, if the same signature of performance indicator degradation is observed at another site in the network (or at the same site), then the intelligence layer or radio access network intelligent controller can attempt to match the signature of performance indicator degradation with a corresponding machine learning model, within the machine learning model library, and thereby apply the appropriate configuration parameter change in a closed-loop fashion. The reference to "closed-loop" functionality herein can refer to functionality whereby a proven solution is applied, in a repeated fashion, with zero or minimal manual intervention on the part of network administrators. Accordingly, in various embodiments, the corresponding solution indicated by the machine learning model is performed as part of a closed radio access network optimization loop.

At step 1210, one or more of the systems described herein may detect that a performance indicator is degrading, and this instance of performance indicator degradation may match a previously encountered instance of the same performance indicator degrading at a different site, as further discussed above. In response, at step 1212, one or more of the systems described herein, such as a radio access network intelligent controller, can apply a configuration parameter change indicated by the machine learning model as improving the performance indicator that was detected as degrading. Accordingly, the overall radio access network solution can benefit from learning about previous performance indicator degradation instances and corresponding solutions that were proven to be successful, by repeating the solutions that were known to be successful, as discussed in more detail above.

Figure 13:
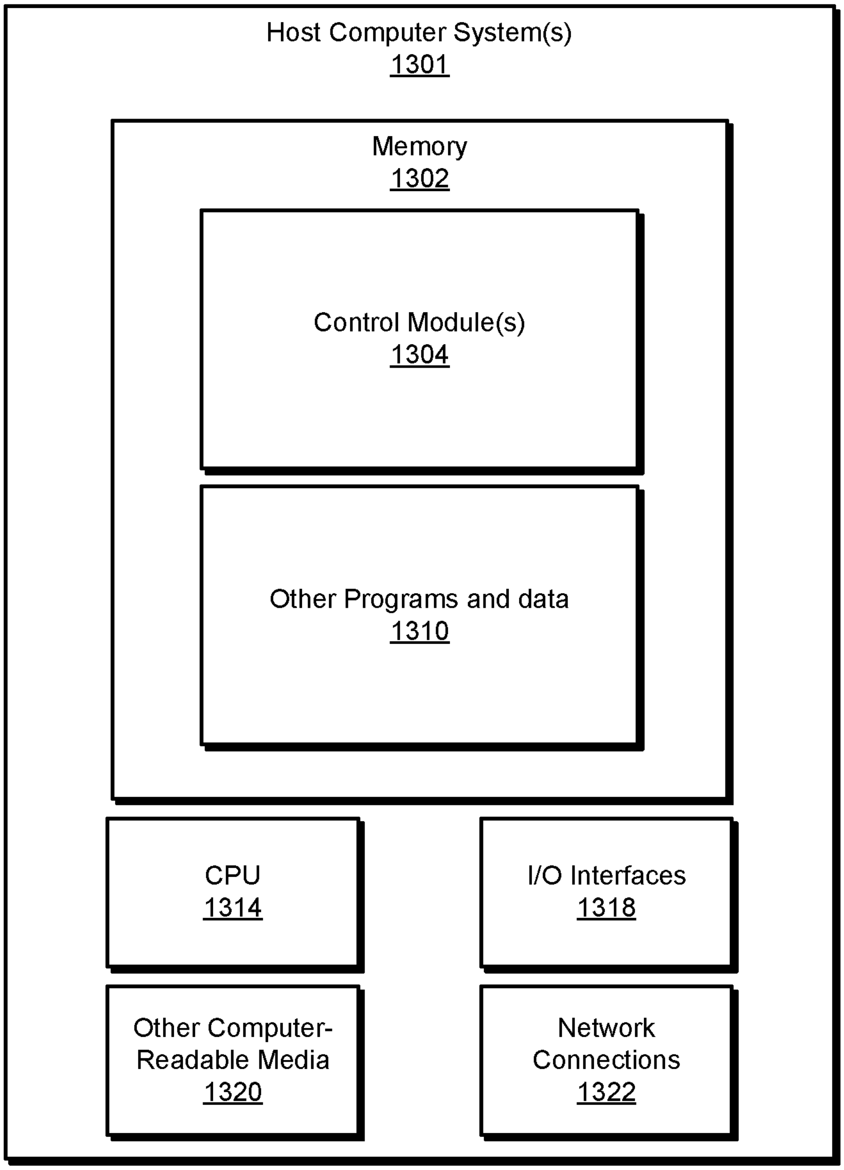
FIG. 13 shows a diagram of an example computing system that may facilitate the performance of one or more of the methods described herein.

FIG. 13 shows a system diagram that describes an example implementation of a computing system(s) for implementing embodiments described herein. The functionality described herein can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 13 illustrates an example of underlying hardware on which such software and functionality may be hosted and/or implemented.

In particular, shown is example host computer system(s) 1301. For example, such computer system(s) 1301 may execute a scripting application, or other software application, to perform method 100, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 1301 may include memory 1302, one or more central processing units (CPUs) 1314, I/O interfaces 1318, other computer-readable media 1320, and network connections 1322.

Memory 1302 may include one or more various types of non-volatile and/or volatile storage technologies. Examples of memory 1302 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 1302 may be utilized to store information, including computer-readable instructions that are utilized by CPU 1314 to perform actions, including those of embodiments described herein.

Memory 1302 may have stored thereon control module(s) 1304. The control module(s) 1304 may be configured to implement and/or perform some or all of the functions of the systems or components described herein. Memory 1302 may also store other programs and data 1310, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 1322 are configured to communicate with other computing devices to facilitate the functionality described herein. In various embodiments, the network connections 1322 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1318 may include a video interface, other data input or output interfaces, or the like. Other computer-readable media 1320 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

detecting that a software package has become available to be applied within an open radio access network;

executing a sorting algorithm that sorts a set of telecommunications sites from a larger set of telecommunications sites due to members of the set of telecommunications sites having at least one common characteristic;

detecting, through autonomous monitoring of the open radio access network, that utilization at the set of telecommunications sites is sufficiently low to trigger graceful shutdown and upgrade procedures;

shutting down gracefully the set of telecommunications sites by handing over at least one call to another telecommunications site servicing a common area; and upgrading autonomously the set of telecommunications sites by applying the software package to the open radio access network after shutting down gracefully the set of telecommunications sites;

wherein:

the at least one common characteristic comprises a common time window during which members of the set of telecommunications sites indicate a level of utilization below a threshold level; and gracefully shutting down the set of telecommunications sites comprises toggling a graceful shutdown flag that triggers a handover procedure for handing over telephone calls to another distributed unit.

2. The method of claim 1, further comprising restoring the set of telecommunications sites to active functionality in a manner that avoids dropping at least one telephone call.

3. The method of claim 1, wherein detecting, through autonomous monitoring of the open radio access network, that utilization at the set of telecommunications sites is sufficiently low to trigger graceful shutdown and upgrade procedures further comprises detecting that the set of telecommunications sites is not handling an emergency call.

4. The method of claim 1, wherein gracefully shutting down the set of telecommunications sites comprises preventing the set of telecommunications sites from accepting inbound telephone calls.

5. The method of claim 1, wherein detecting that utilization at the set of telecommunications sites is sufficiently low to trigger graceful shutdown and upgrade procedures is based on an analysis of telemetry data.

6. The method of claim 5, wherein the telemetry data is continuously streamed from the open radio access network to a centralized data platform.

7. The method of claim 1, wherein a radio access network intelligent controller upgrades autonomously the set of telecommunications sites by applying the software package to the open radio access network after shutting down gracefully the set of telecommunications sites.

8. A system comprising:

a physical computing processor; and a non-transitory computer-readable medium encoding instructions that, when executed by the physical computing processor, cause a computing device to perform operations comprising:

detecting that a software package has become available to be applied within an open radio access network;

executing a sorting algorithm that sorts a set of telecommunications sites from a larger set of telecommunications sites due to members of the set of telecommunications sites having at least one common characteristic;

detecting, through autonomous monitoring of the open radio access network, that utilization at the set of telecommunications sites is sufficiently low to trigger graceful shutdown and upgrade procedures;

shutting down gracefully the set of telecommunications sites by handing over at least one call to another telecommunications site servicing a common area; and upgrading autonomously the set of telecommunications sites by applying the software package to the open radio access network after shutting down gracefully the set of telecommunications sites;

wherein:

the at least one common characteristic comprises a common time window during which members of the set of telecommunications sites indicate a level of utilization below a threshold level; and gracefully shutting down the set of telecommunications sites comprises toggling a graceful shutdown flag that triggers a handover procedure for handing over telephone calls to another distributed unit.

9. The system of claim 8, wherein the operations further comprise restoring the set of telecommunications sites to active functionality in a manner that avoids dropping at least one telephone call.

10. The system of claim 8, wherein detecting, through autonomous monitoring of the open radio access network, that utilization at the set of telecommunications sites is sufficiently low to trigger graceful shutdown and upgrade procedures further comprises detecting that the set of telecommunications sites is not handling an emergency call.

11. The system of claim 8, wherein gracefully shutting down the set of telecommunications sites comprises preventing the set of telecommunications sites from accepting inbound telephone calls.

12. The system of claim 8, wherein detecting that utilization at the set of telecommunications sites is sufficiently low to trigger graceful shutdown and upgrade procedures is based on an analysis of telemetry data.

13. The system of claim 12, wherein the telemetry data is continuously streamed from the open radio access network to a centralized data platform.

14. A non-transitory computer-readable medium encoding instructions that, when executed by at least one physical processor of a computing device, cause the computing device to perform operations comprising:

detecting that a software package has become available to be applied within an open radio access network;

executing a sorting algorithm that sorts a set of telecommunications sites from a larger set of telecommunications sites due to members of the set of telecommunications sites having at least one common characteristic;

detecting, through autonomous monitoring of the open radio access network, that utilization at the set of telecommunications sites is sufficiently low to trigger graceful shutdown and upgrade procedures;

shutting down gracefully the set of telecommunications sites by handing over at least one call to another telecommunications site servicing a common area; and upgrading autonomously the set of telecommunications sites by applying the software package to the open radio access network after shutting down gracefully the set of telecommunications sites;

wherein:

the at least one common characteristic comprises a common time window during which members of the set of telecommunications sites indicate a level of utilization below a threshold level; and gracefully shutting down the set of telecommunications sites comprises toggling a graceful shutdown flag that triggers a handover procedure for handing over telephone calls to another distributed unit.

* * * * *